(12) United States Patent
Hashiba

(10) Patent No.: US 6,861,020 B2
(45) Date of Patent: Mar. 1, 2005

(54) METHODS FOR MANUFACTURING PRESS MOLDED ARTICLES

(75) Inventor: Masanori Hashiba, Mizunami (JP)

(73) Assignee: Araco Kabushiki Kaisha, Aichi-ken (JP)

(*) Notice: Subject to any disclaimer, the term of this patent is extended or adjusted under 35 U.S.C. 154(b) by 204 days.

(21) Appl. No.: 10/246,027

(22) Filed: Sep. 18, 2002

(65) Prior Publication Data

US 2003/0052430 A1 Mar. 20, 2003

(30) Foreign Application Priority Data

Sep. 20, 2001 (JP) ........................................ 2001-287100

(51) Int. Cl.[7] ................................................ B29C 44/06
(52) U.S. Cl. ....................................... 264/46.4; 264/46.6
(58) Field of Search ............................... 264/46.4, 46.6

(56) References Cited

U.S. PATENT DOCUMENTS

| | | | | |
|---|---|---|---|---|
| 5,252,269 A | * | 10/1993 | Hara et al. | 264/45.3 |
| 5,281,376 A | * | 1/1994 | Hara et al. | 264/46.4 |
| 5,437,823 A | * | 8/1995 | Hettinga et al. | 264/45.5 |
| 5,585,061 A | * | 12/1996 | Hara et al. | 264/259 |
| 5,785,910 A | * | 7/1998 | Sakashita et al. | 264/45.5 |
| 6,129,870 A | * | 10/2000 | Hettinga | 264/40.5 |
| 6,146,564 A | * | 11/2000 | Beckmann | 264/46.5 |
| 6,660,195 B2 | * | 12/2003 | Usui et al. | 264/46.4 |

| | | | |
|---|---|---|---|
| 2001/0016255 A1 | | 8/2001 | Usui et al. ............... 428/318.6 |

FOREIGN PATENT DOCUMENTS

| | | |
|---|---|---|
| EP | 0544501 | 11/1992 |
| EP | 0764506 | 3/1996 |
| GB | 2155846 | 3/1985 |
| JP | 07318413 | 12/1995 |
| JP | 08063336 | 3/1996 |
| JP | 9-156008 A | 6/1997 |
| JP | 10205303 | 7/1998 |
| JP | 2000-190345 A | 7/2000 |

* cited by examiner

Primary Examiner—Allan R. Kuhns
(74) Attorney, Agent, or Firm—Patterson, Thuente, Skaar & Christensen, P.A.

(57) ABSTRACT

Methods are taught for manufacturing a press molded article (1) that comprises a profiled substrate layer (10) and a foamed layer (20). A substrate material (12) may be press molded with a foamable material (22) under pressure in order to join or attach the foamable material to the substrate material. In addition, a profile may be imparted to the substrate material during the press molding step, thereby forming the profiled substrate layer. After the press molding step has been completed, the foamable material is foamed and expanded, to thereby form the foamed layer. A skin material (32) optionally may be applied to the foamable layer before the press molding step. Optionally, embossed patterns may be imparted to the skin material during the press molding step, thereby forming an embossed skin layer (30) that is attached to the foamed layer.

12 Claims, 6 Drawing Sheets

METHODS FOR MANUFACTURING PRESS MOLDED ARTICLES

This application claims priority to Japanese Patent Application Serial Number 2001-287100, the contents of which are incorporated herein by reference.

BACKGROUND OF THE INVENTION

1. Field of the Invention

The present invention relates to methods for manufacturing press molded articles. More particularly, the present invention relates to methods for manufacturing a press molded article that comprises a substrate layer and a foamed layer, such as a profiled vehicle door trim or a profiled vehicle roof trim.

2. Description of the Related Art

Generally speaking, known profiled vehicle trim products include a profiled plate-like resin substrate layer, a soft foamed layer disposed on the substrate layer, and an uppermost skin or covering layer having embossed patterns formed thereon. Typically, such a trim product is a manufactured as a press molded article by press molding. For example, according to known techniques, an embossed skin material is first adhered to a sheet of foamed material, to thereby form a decorative laminate. Thereafter, a substrate material and the decorative laminate are placed in a press die of a press molding apparatus, and the substrate material is press molded together with the decorative laminate. As a result, the profiled trim product is formed such that the skin layer and the foamed layer are attached to the profiled substrate layer.

However, according to this known method for manufacturing trim products, the foamed layer may be excessively compressed or thinned by the heat and pressure applied during the press molding step. Such a thinned foamed layer may lack elasticity and the foamed layer of the trim product may feel hard. In addition, if the foamed layer is relatively thick, undesirable depressed portions or recesses may be formed in the foamed layer during the press molding step. Such depressed portions may degrade the appearance of the trim product.

Further, because the substrate material is press molded together with a compressible foamed layer in the known technique, the substrate material cannot be desirably or sufficiently shaped or profiled during the press molding step. Such insufficient shaping or profiling of the substrate material may result in a trim product having a dull profile. In addition, the embossed patterns that are previously formed on the skin layer may be deformed or destroyed during the press molding step.

Known trim products have also been manufactured by another method. For example, the embossed skin layer may be adhered to the foamed layer, to thereby form the decorative laminate. Separately, only the substrate material is press molded, to thereby form a profiled or shaped substrate layer. Thereafter, the decorative laminate is adhered to the profiled substrate layer, to thereby form the trim product in which the skin layer and the foamed layer are attached to the profiled substrate layer.

However, this known technique typically increases the minimum number of steps for manufacturing the trim product. In addition, it is generally difficult to adhere the decorative laminate to the shaped or profiled substrate layer. Therefore, labor-intensive and time consuming work is required to form the press molded article using this known method.

SUMMARY OF THE INVENTION

It is, accordingly, one object of the present teachings to provide improved methods for manufacturing a press molded article.

For example, in one aspect of the present teachings, methods are taught for manufacturing a press molded article that comprises a substrate layer and a foamed layer. In these methods, a substrate material may be press molded with a foamable material under pressure, to thereby join or adhere the foamable material with the substrate material. Thereafter, the foamable material is foamed and/or expanded, to thereby form the foamed layer.

In this case, the foamed layer of the press molded article may be formed after completion of the press molding step. Therefore, the press molding step cannot damage the foamed layer and the press molded article may have attractive appearance.

Other objects, features and advantage of the present invention will be ready understood after reading the following detailed description together with the accompanying drawings and the claims.

DETAILED DESCRIPTION OF THE INVENTION

Figure 1:
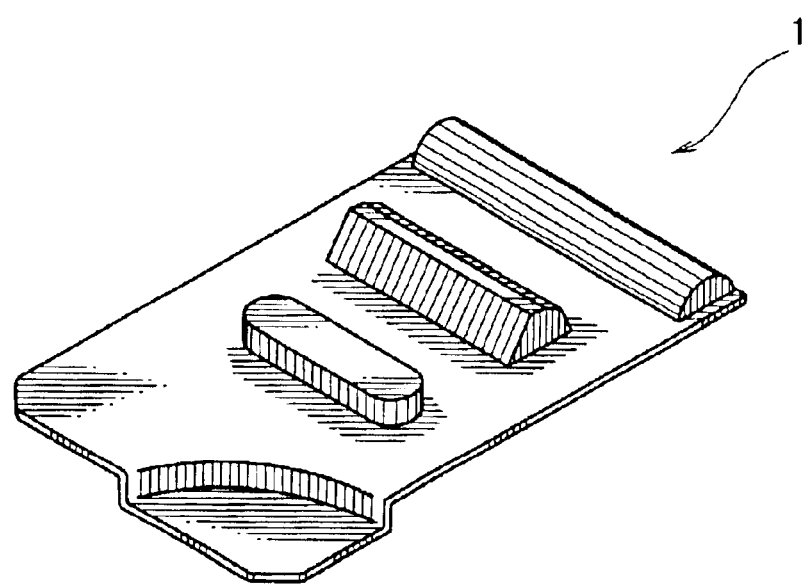
FIG. 1 is a perspective view of a trim product manufactured according to a representative method for manufacturing a press molded article of the present teachings.

In one embodiment of the present teachings, a press molded article that comprises a substrate layer and a foamed layer is manufactured. For example, a substrate material is first press molded with a foamable material under pressure. As a result, an intermediate press molded article is formed with an intermediate foamed layer that is attached to a substrate layer. Optionally, the substrate material may be press molded into a profiled substrate layer during the press molding step. In addition, the foamable material preferably contains a foaming agent. During the press molding step, the foaming agent preferably decomposes, to thereby generate cell forming substances within the intermediate foamed layer. However, because the cell forming substances are highly compressed due to the pressure applied during the press molding step, the cell forming substances can not expand and cells do not form within the intermediate foamed layer until after the pressure is reduced. As a result, the intermediate foamed layer does not expand during the press molding step.

Thereafter, the pressure applied to the intermediate press molded article is reduced. Consequently, the cell forming substances within the intermediate foamed layer will expand and generate cells within the intermediate foamed layer, thereby forming the foamed layer. Thus, the press molded article can be formed with the foamed layer attached to the substrate layer, which may optionally be a profiled substrate layer.

Optionally, the substrate material may first be heated to a temperature higher than the temperature that generates the cell forming substances before the press molding step. In this case, the foamable material will be heated during the press molding step by the heat from the pre-heated substrate material.

In another optional embodiment, a skin material may be disposed on the foamable material for decorative purposes before the press molding step. In this optional embodiment, the skin material also may be optionally embossed during the press molding step in order to form an embossed skin layer.

According to the present teachings, the terms "foamable material" and "foamable layer" are generally intended to mean a material that is capable of foaming and/or expanding, but is in a non-expanded state. For example, "foamable materials" and "foamable layers" according to the present teachings may be expanded, e.g., by applying heat and/or reduced pressure to the "foamable materials" or "foamable layers." After the "foamable material" or "foamable material" has been foamed and/or expanded by any suitable method, it will be referred to as a "foamed layer." Further, the term "substrate material" is intended to include a variety of materials that may define a substrate. After pressing molding, the "substrate material" is converted into a "substrate layer." Optionally, the shape of the substrate material may be changed during the press molding step in order to impart a profile to the substrate material and form a profiled substrate layer.

A representative embodiment of the present teachings will now be described in further detail with reference to FIGS. 1 to 9. A profiled vehicle door trim product 1 (FIG. 1) will be exemplified as a representative press molded article that can be prepared utilizing the present teachings.

Before describing the representative embodiment in further detail, however, a brief explanation of the construction of the representative door trim product 1 and a representative method for manufacturing the door trim product 1 will be provided.

Figure 9:
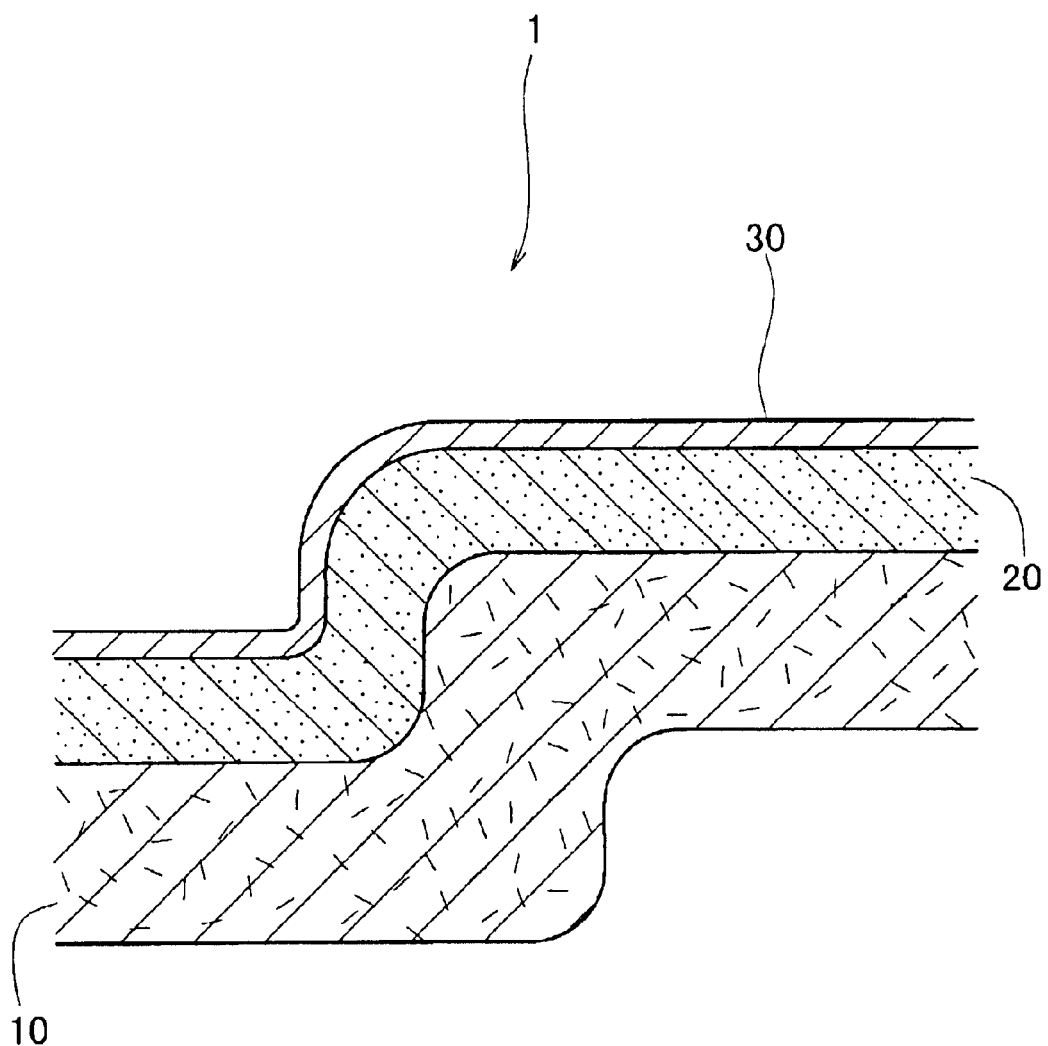
FIG. 9 is cross-sectional view of the completed trim product after it has been removed from the press molding die.

As shown in FIG. 9, the representative door trim product 1 may include a substrate layer 10, a foamed layer 20 disposed on (attached to) the substrate layer 10 and a skin layer 30 covering the foamed layer 20. Each of these layers may comprise one or more resin materials suitable for the particular layer. The skin layer 30 may serve to reinforce and/or protect the foamed layer 20. In addition, embossed patterns (not shown) may be defined on the skin layer 30 in order to impart an attractive appearance to the door trim product 1.

Figure 2:
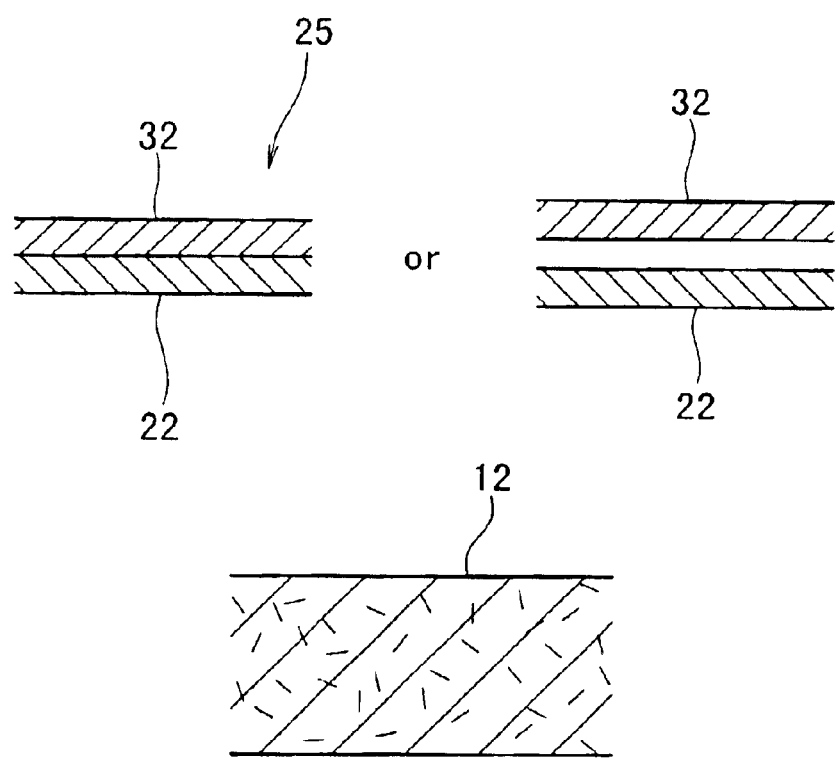
FIG. 2 shows two cross-sectional views of a foamable material and a skin material, as well as one cross-section view of a substrate material, that can be used to form the trim product shown in FIG. 1.
Figure 3:
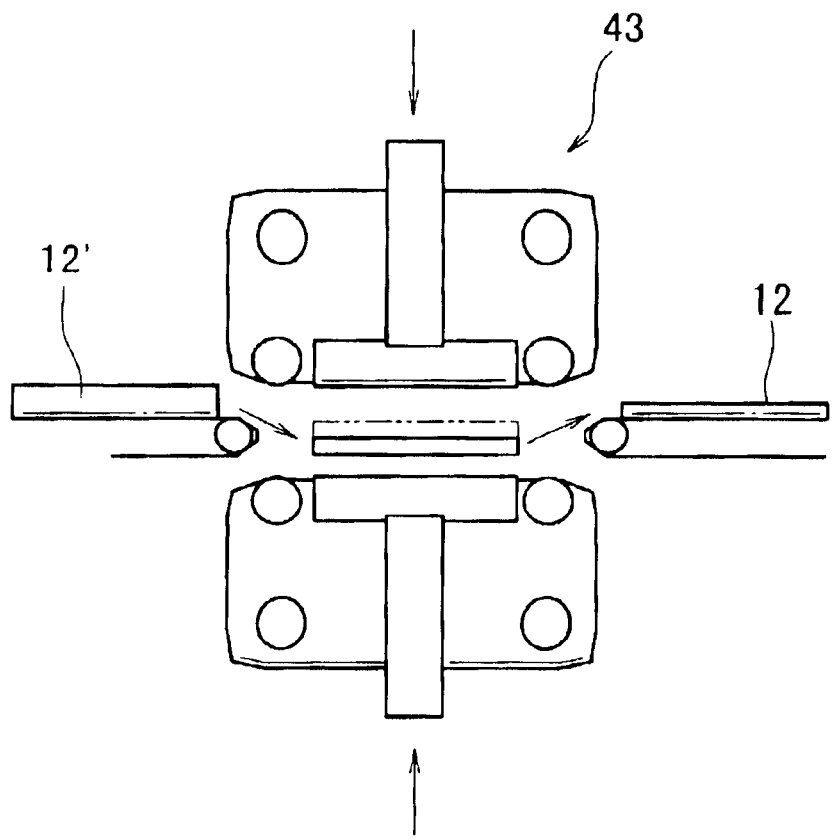
FIG. 3 is a schematic view illustrating a representative technique for manufacturing the substrate material shown in FIG. 2.

The representative door trim product 1 may be manufactured by press molding a plate-like substrate material 12, a sheet-like foamable material 22 and a sheet-like skin material 32 in a press molding apparatus, as shown in FIG. 2. For example, as shown in FIG. 3, a mat-like material block 12' made from a resinous material may be introduced into a compression molding machine 43 and then compressed therein under heat and pressure, to thereby form the plate-like substrate material 12.

Figure 4:
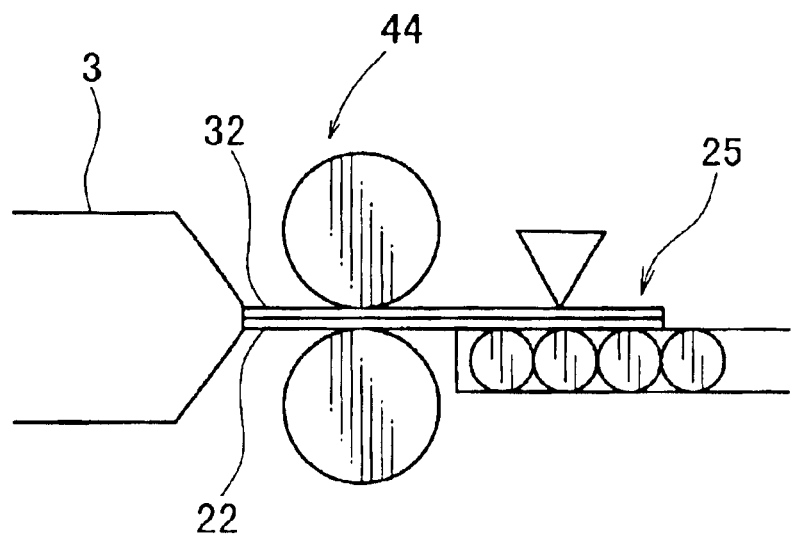
FIG. 4 is a schematic view illustrating a representative technique for manufacturing a laminate of the foamable material and the skin material.
Figure 5:
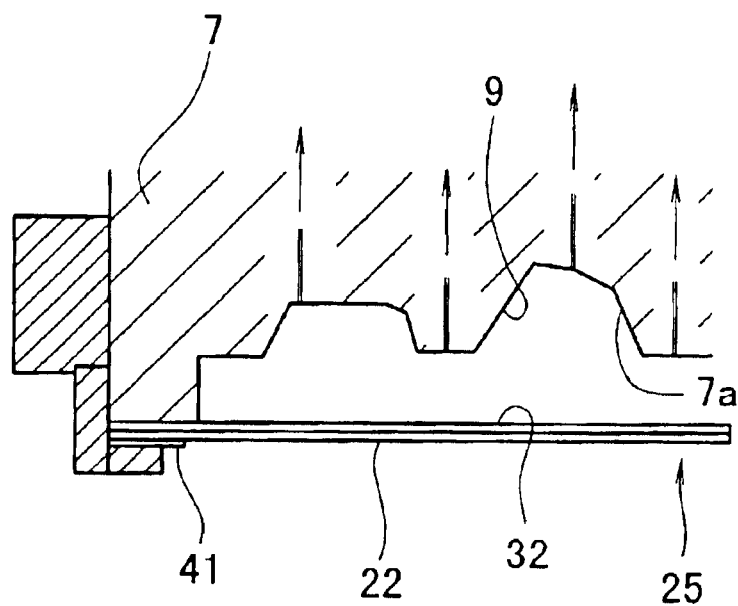
FIG. 5 is cross-sectional view of an upper die of a representative press molding die into which the laminate has been disposed.
Figure 6:
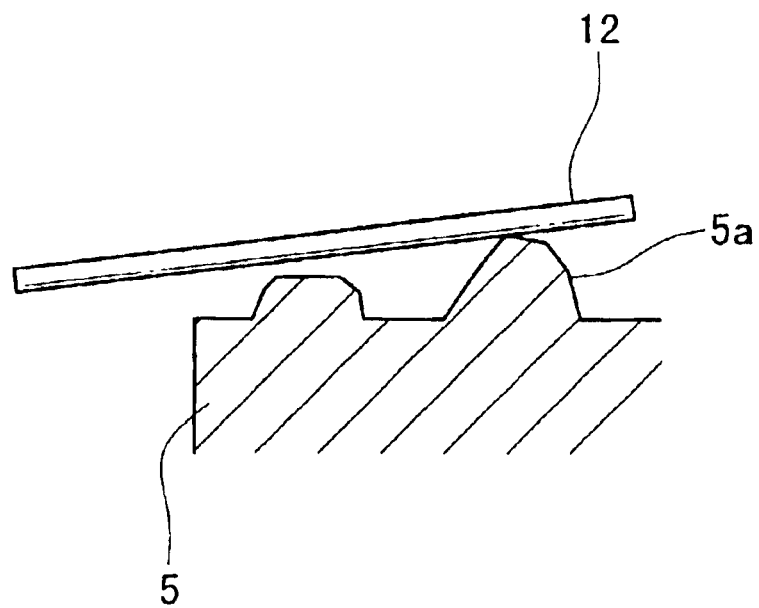
FIG. 6 is cross-sectional view of a lower die of the representative press molding die into which the substrate material has been disposed.

As shown in FIG. 4, two types of resinous materials may be co-extruded from an extruder 3 of an extrusion molding machine 44, to thereby respectively form the skin material 32 and the foamable material 22. By co-extruding two resin materials, the skin material 32 can be simultaneously layered and bonded with the foamable material 22, to thereby form a laminate 25. Thereafter, the substrate material 12 and the laminate 25 may be placed into a press molding apparatus 45, which preferably includes an upper molding die 7 that can move relative to a lower molding die 5, as shown in FIGS. 5 and 6.

Figure 7:
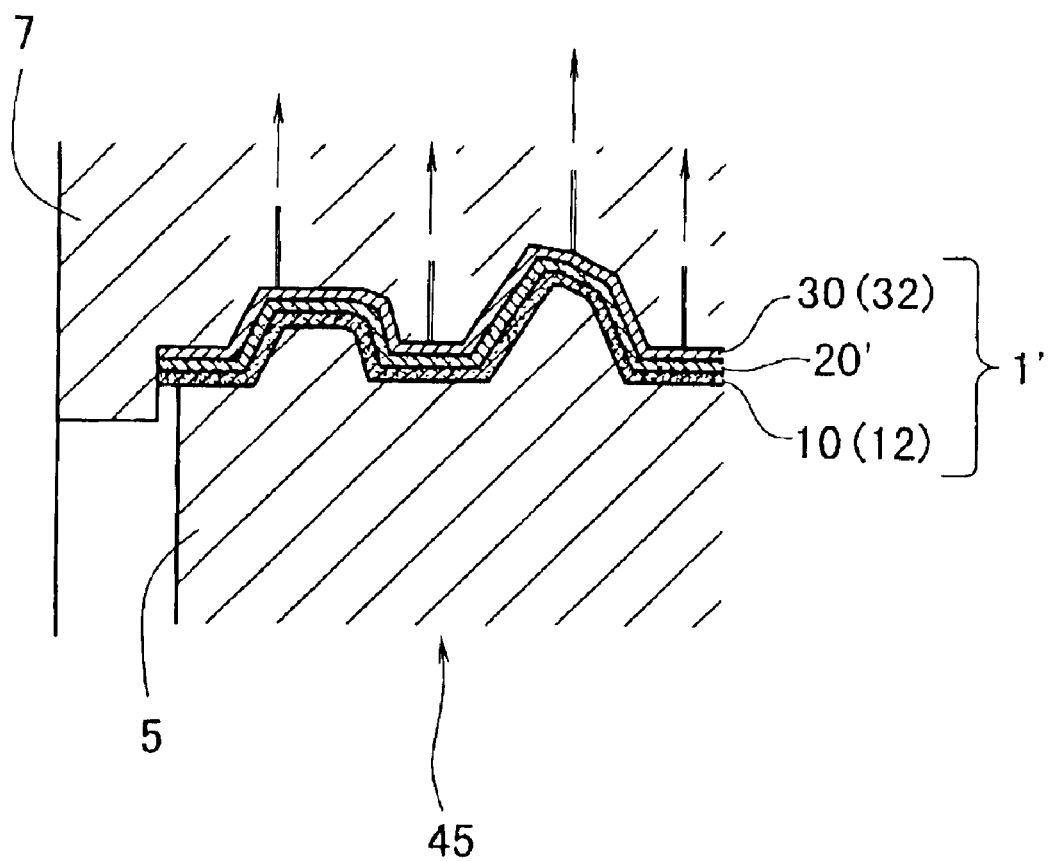
FIG. 7 is cross-sectional view of the press molding die in which the substrate material and the laminate are press molded in order to form the trim product.
Figure 8:
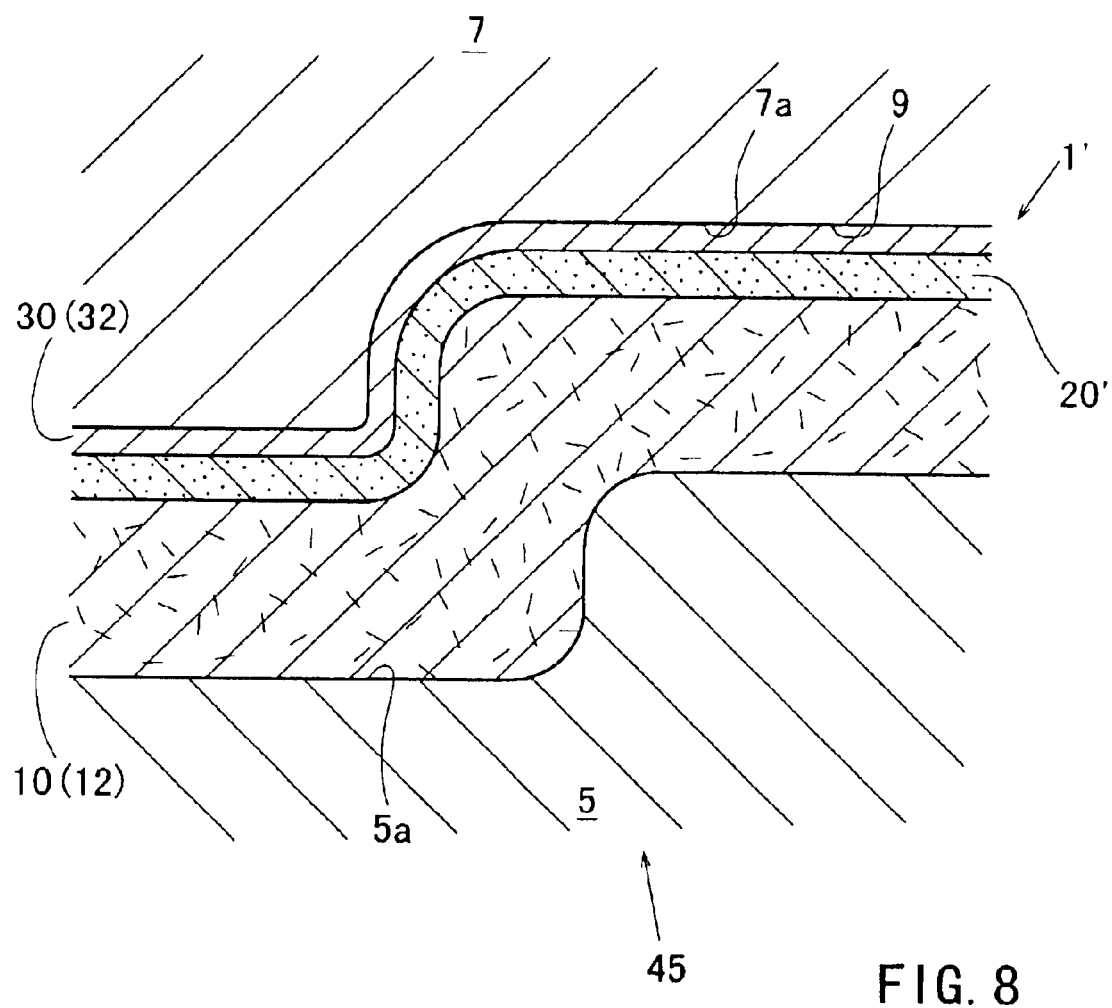
FIG. 8 is cross-sectional view of the completed trim product before it has been removed from the press molding die.

Then, the substrate material 12 may be press molded together with the laminate 25 using the press molding apparatus 45 under pressure and optional heating. As a result, an intermediate trim product 1' is formed in which the skin layer 30 and an intermediate foamed layer 20' are attached or bonded to a profiled substrate layer 10, as shown in FIGS. 7 and 8. That is, the shape of the substrate material 12 optionally may be altered or changed so as to conform to the shape of the upper and lower dies 5, 7 during the press molding step, thereby forming the profiled substrate layer 10. Subsequently, the upper and lower dies 5, 7 of the press molding apparatus 45 may be opened and the intermediate trim product 1' is removed from the press molding apparatus 45. When the intermediate trim product 1' is released from the press molding apparatus and is placed under reduced pressure (e.g., normal atmospheric pressure), the intermediate foamed layer 20' expands to form the foamed layer 20. As a result, the representative trim product 1 is formed in which the skin layer 30 and the foamed layer 20 are attached to the profiled substrate layer 10, as shown in FIG. 9.

As was briefly described above, the door trim product 1 is preferably manufactured by press molding the plate-like substrate material 12, the foamable material 22 and the skin material 32 in a press molding apparatus. Further details concerning the manufacture of the representative embodiment will now be described.

The material block 12' that will be processed to form the substrate material 12 preferably comprises a thermoplastic material that contains at least one resin material. More preferably, the thermoplastic material may contain one or more thermoplastic resins. For example, the material block 12' may preferably comprise a thermoplastic material that contains at least one polyolefin-containing thermoplastic resin, e.g., polypropylene and/or polyethylene. However, as will be appreciated by persons skilled in the art, a variety of thermoplastic resins may be utilized with the present teachings.

The thermoplastic material for the material block 12' may also contain other materials, such as fibrous materials, e.g., glass fibers, synthetic fibers and wood-based fibers. In addition or in the alternative, the thermoplastic material may contain carbon black, wood-based particles and/or metallic particles. Optionally, fibrous materials may be a primary or major component of the thermoplastic material. In such case, the thermoplastic resin(s) in the thermoplastic material may simply serve as a binder for the fibrous materials. In addition, the material block 12' can be formed as a laminate that comprises a plurality of layers that are respectively made from different types of thermoplastic materials.

The thermoplastic material may be formulated by kneading one or more fibrous materials with one or more molten or liquefied thermoplastic resin(s). If the fibrous materials comprise wood-based fibers, such fibers may preferably be prepared by defibrating wood pulp and more preferably, by defibrating digested or cooked wood pulp. The thermoplastic material thus formulated may be appropriately formed into the material block 12' by entangling or commingling the fibrous materials contained therein. Thereafter, the block 12' may be compressed at an elevated temperature and pressure, to thereby form the plate-like substrate material 12, which preferably has a desired thickness and rigidity.

Further, if the thermoplastic material contains one or more thermoplastic resins as the primary or a major component, the molten (or liquefied) thermoplastic material can be extrusion molded by utilizing a extrusion molding machine (not shown) and then rolled by utilizing a rolling machine (not shown). In this case, the substrate material 12 may be directly formed without pre-forming the material block 12'. As will be appreciated by those skilled in the art, the material block 12' and the substrate material 12 can be formed by a variety of known techniques and the present teachings are not particularly limited in this aspect.

The foamable material 22 may comprise one or more known foamable materials that preferably contain at least one cross-linkable material and at least one cross-linking agent. For example, the foamable material 22 may comprise a foamable material that contains at least one resin from the polyolefin family, e.g., polyethylene, polypropylene and/or mixtures thereof, at least one cross-linking agent and at least one foaming agent. The foaming agent may include known foaming agents, such as organic foaming agents, e.g., azodicarbonamide (ADCA), citric acid and/or 4,4'-oxybis (benzenesulfonyl hydrazide) (OBSH), inorganic foaming agents such as sodium bicarbonate, and/or combinations thereof.

The foamable material 22 may have a wide range of thickness. However, the foamable material 22 may preferably have a thickness between about 0.2 mm and 1.0 mm. If the foamable material 22 has a thickness less than 0.2 mm, the foamed layer 20 typically does not have a sufficient thickness for processing according to the present techniques. Moreover, if the thickness of foamed layer 20 is insufficient, the foamed layer 20 may lack elasticity. On the other hand, if the foamable material 22 has a thickness greater than 1.0 mm, the foamable material 22 may not be sufficiently heated to a temperature that decomposes the foaming agent and generates gases or cell forming substances therein. In this case, the foamable material 22 can not be sufficiently expanded. Such an insufficiently expanded foamable material 22 may lead to an undesirable appearance of the foamed layer 20.

"Cell forming substances" according to the present teachings are intended to include any substance that can form cells (e.g., pockets or voids) within the foamable material 22. That is, cell forming substances preferably cause the foamable material 22 to expand so as to form the foamed layer 20. For example, representative cell forming substances may include low boiling point substances generated by decomposing the foaming agent. In addition, if polyurethane is utilized as the foamable material, representative cell forming substances may include carbon dioxide that is generated by a chemical reaction between the isocyanate group of the polyurethane and water contained therein.

The skin material 32 also may comprise a variety of known materials, such as woven fabrics, non-woven fabrics, natural or synthetic leathers and/or plastic sheets. Preferably, the skin material 32 may comprise at least one thermoplastic material that contains a thermoplastic elastomer from the polyolefin family (e.g., TPO resins) as a primary component. As will be appreciated by persons skilled in the art, the skin material 32 may be appropriately shaped so as to have a desired thickness.

The foamable material 22 and the skin material 32 may be separately formed, as shown in FIG. 2. However, the foamable material 22 and the skin material 32 also may be simultaneously formed as a laminate 25 of the foamable material 22 and the skin material 32, as shown in FIG. 2. Such a laminate 25 permits easy handling of the foamable material 22 and the skin material 32.

The press molding apparatus 45 for manufacturing the trim product 1 may be a known press molding apparatus, which preferably includes an upper molding die 7 that can move relative to a lower molding die 5, as shown in FIGS. 5 and 6. The upper molding die 7 may include a first or upper molding surface 7a that is defined on the lower surface of the upper molding die 7. Naturally, the upper molding surface 7a may be shaped so as to substantially correspond to the desired outer profile of the door trim product 1. Optionally, the upper molding surface 7a may include embossed patterns 9 that correspond to the embossed patterns that will be formed on the skin material 32 during the press molding step.

A clamping device 41 may be disposed around the upper molding die 7. The clamping device 41 preferably functions to temporarily fix or hold the laminate 25 on the upper molding surface 7a of the upper molding die 7. As shown in FIG. 5, the laminate 25 (i.e., the skin material 32 and the foamable material 22) may be, e.g., tensionally disposed or placed onto the upper molding surface 7a.

The lower surface of the upper molding die 7 preferably communicates with a vacuum source, such as a vacuum pump (not shown). The vacuum source can draw or suction the laminate 25 towards the upper molding surface 7a of the upper molding die 7. In this case, the laminate 25 will be pre-formed due to the vacuum (reduced pressure) applied to the upper molding surface 7a of the upper molding die 7 before the press molding step and will be closely retained by the upper molding die 7. That is, the laminate 25 can be preliminarily shaped before the press molding step is initiated by applying a vacuum or reduced pressure to the laminate 25.

As shown in FIG. 6, the lower die 5 may include a second or lower molding surface 5a that is defined on the upper surface of the lower die 5. Naturally, the lower molding surface 5a may be shaped so as to substantially correspond to the upper molding surface 7a of the upper molding surface 7a.

Representative methods for manufacturing the door trim product 1 using this apparatus 45 will now be described. For example, before press molding the laminate 25 using the press molding apparatus 45, the substrate material 12 preferably may be heated to a temperature (e.g., about 220° C.) that is higher than the temperature at which the foaming agent will decompose and generate cell forming substances within the foamable material 22. The substrate material 12 can be heated according to a variety of known methods.

The skin material 32 may preferably be heated to a temperature of about 120° C. 150° C., so that the skin material 32 may have excellent elasticity and flexibility.

However, the foamable material 22 is preferably heated to a temperature close to, but less than, the decomposition temperature of the foaming agent contained in the foamable material 22.

Subsequently, the press molding apparatus 45 is actuated in order to open the upper and lower dies 5, 7. Then, as shown in FIG. 5, the laminate 25 (i.e., the skin material 32 and the foamable material 22) is disposed or placed on the upper molding surface 7a of the upper molding die 7. As a result, the skin material 32 will directly face or oppose the upper molding surface 7a. As indicated above, the laminate 25 may be tensionally fixed to the upper molding die 7 by the clamping device 41. Thereafter, the laminate 25 is drawn towards the upper molding surface 7a due to the vacuum (reduced pressure) applied to the upper molding surface 7a. As a result, the laminate 25 will be pre-formed and will be closely retained on the upper molding surface 7a of the upper molding die 7.

As shown in FIG. 6, the substrate material 12 is disposed or placed on the lower molding surface 5a of the lower molding die 5. Then, the press molding apparatus 45 is reversibly actuated in order to close the upper and lower dies 5, 7. As a result, as shown in FIGS. 7 and 8, the substrate material 12 is press molded together with the laminate 25 under heat and pressure, to thereby form the intermediate trim product 1' in which the skin layer 30 and the intermediate foamed layer 20' are attached or bonded to the profiled substrate layer 10. Further, one or more embossed patterns (not shown) may be imparted to the skin layer 30, if the skin material 32 has been embossed by the embossed patterns 9 defined on the upper molding surface 7a of the upper molding die 7.

When the substrate material 12 and the laminate 25 are press molded within the press molding apparatus 45, the foamable material 22 is heated by the heat of the substrate material 12. If the substrate material 12 has been heated to a temperature (e.g., about 220° C.) that is higher than the temperature at which the foaming agent decomposes, the foamable material 22 is effectively heated to the foaming agent decomposition temperature or higher, to thereby generate cell forming substances within the foamable material 22. Furthermore, the foamable material 22 also may optionally be chemically modified by a cross-linking reaction during the press molding step. In this case, during the press molding step, the foamable material 22 will materially change into the intermediate foamed layer 20' that contains cell forming substances therein.

The cell forming substances preferably have the potential to expand and/or form cells within the intermediate foamed layer 20' when the pressure applied to the intermediate foamed layer 20' is reduced or withdrawn, e.g., the intermediate foamed layer 20' is subjected to normal atmospheric pressure. However, by compressing the cell forming substances under high pressure during the press molding step, the cell forming substances can not expand during the press molding step. Thus, cells will not form within the intermediate foamed layer 20' during the press molding step. As a result, because the intermediate foamed layer 20' does not expand (or does not significantly expand) during the press molding step, the intermediate foamed layer 20' will typically maintain substantially the same volume as the foamable material 22 during the press molding step.

After completion of press molding step, the press molding apparatus 45 is actuated again in order to open the upper and lower dies 5, 7 of the press molding apparatus 45 and to depressurize the press molding apparatus 45. In other words, when the upper and lower dies 5, 7 are opened, the intermediate trim product 1' will be subjected to a reduced pressure (e.g., normal atmospheric pressure). At the reduced pressure, the cell forming substances can expand in order to form cells within the intermediate foamed layer 20' due to expansion of the cell forming substances. As a result, as shown in FIG. 9, the intermediate foamed layer 20' may expand into the foamed layer 20, to thereby form the trim product 1 in which the skin layer 30 and the foamed layer 20 are attached or bonded to the profiled substrate layer 10.

Thereafter, the skin layer 30 and the substrate layer 10 may be cooled until the skin layer 30 and the substrate layer 10 have attained a self-supporting hardness. Then, the trim product 1 may be removed from the press molding apparatus 45. Further, if the upper and lower dies 5, 7 are not pre-heated, the trim product 1 can be easily and rapidly cooled by the cooling effects (heat sink properties) of the dies 5, 7. The removed trim product 1 optionally may then be subjected to further processing in order to trim its periphery and/or to attach various components thereto.

In additional embodiments of the present teachings, the foaming agent(s) may include one or more substances that generate liquid and/or solid cell forming substances, in addition to or instead of gaseous cell forming substances. Further, the foaming agent(s) may include substances that do not generate cell forming substances during the press molding step and instead, only generate such cell forming substances after the upper and lower dies 5, 7 have been opened (e.g., only under reduced pressures).

Although the substrate material 12 may be heated to a temperature (e.g., about 220° C.) that is higher than the decomposition temperature of the foaming agent(s), the lower die 7 can instead be heated to such a high temperature in order to decompose the foaming agent(s).

If the cell forming substances are compressed during the press molding step, the cell forming substances can not easily migrate within the intermediate foamed layer 20'. In that case, the cell forming substances cannot easily coagulate and combine with each other. Therefore, it is preferable to uniformly disperse the cell forming substances within the intermediate foamed layer 20'. Such uniformly dispersed cell forming substances may form an excellent foamed layer 20 in which small cells are uniformly dispersed.

Furthermore, if the intermediate foamed layer 20' is sandwiched or interleaved between the substrate layer 10 and the skin layer 30, the cell forming substances may be effectively trapped within the intermediate foamed layer 20' during the press molding step. In this case, the foamed layer 20 will sufficiently and reliably expand.

DETAILED REPRESENTATIVE EXAMPLE

Wood based fibers obtained by defibrating kenaf were mixed with polypropylene at a weight ratio of 1:1, to thereby form a thermoplastic material. More specifically, kenaf fibers and polypropylene fibers were mixed at the weight ratio of 1:1 and the mixture was processed to form a plurality of thermoplastic material mats. These mats were laminated and combined by needle punching, to thereby form the material block 12'. Thereafter, as shown in FIG. 3, the material block 12' was introduced into the compression molding machine 43 and was compressed therein under heat and pressure. Specifically, material block 12' was compressed at a temperature of about 230° C. and a pressure of about 80 tons. As a result, the plate-like substrate material 12 was formed with a desired thickness. Then, the substrate material 12 was heated to a temperature of at least about 220° C., which temperature is higher than the decomposition temperature of the foaming agent disposed within the foamable material, which will be described next.

The foamable material was formed by mixing a resinous material containing low density polyethylene (LDPE) as a primary component, dicumylperoxide as a cross-linking agent, and a foaming agent from the azo-family. The foaming agent had a decomposition temperature of 160° C. In addition, a thermoplastic material that contains thermoplastic elastomers from the polyolefin family as a main component also was formulated.

Thereafter, as shown in FIG. 4, the foamable material and the thermoplastic material were melted and kneaded and then were co-extruded from the extruder 3 of the extrusion molding machine 44, to thereby respectively form the foamable material 22 and the skin material 32. The skin material 32 and the foamable material 22 thus extruded were simultaneously layered and bonded, to thereby form the laminate 25. The extruder 3 was set such that the resulting foamable material 22 had a thickness of about 0.2 mm. Then, the resulting laminate 25 was heated using an infra-red heater to about 150° C., which temperature is less than the decomposition temperature of the foaming agent.

Subsequently, the press molding apparatus 45 was actuated in order to open the upper and lower dies 5, 7. Thereafter, as shown in FIG. 5, the laminate 25 (i.e., the skin material 32 joined to the foamable material 22) was disposed on the upper molding surface 7a of the upper molding die 7, such that the skin material 32 faced the upper molding surface 7a of the upper molding die 7. Further, the laminate 25 was tensionally fixed to the upper molding die 7 by the clamping device 41. Thereafter, the laminate 25 was drawn towards the upper molding surface 7a of the upper molding die 7 by applying a vacuum (reduced pressure). Consequently, the laminate 25 was pre-formed and was closely retained on the upper molding surface 7a of the upper molding die 7. Further, as shown in FIG. 6, the substrate material 12 was disposed on the lower molding surface 5a of the lower molding die 5.

In this state, the press molding apparatus 45 was reversibly actuated in order to close the upper and lower dies 5, 7. Thus, as shown in FIGS. 7 and 8, the substrate material 12 was press molded together with the laminate 25 under heat and pressure, to thereby form the intermediate trim product 1' in which the skin layer 30 and the intermediate foamed layer 20' were attached or bonded to the profiled substrate layer 10.

Thereafter, the press molding apparatus 45 was actuated again in order to open the upper and lower dies 5, 7 and to depressurize the press molding apparatus 45. As a result, as shown in FIG. 9, the intermediate foamed layer 20' expanded into the foamed layer 20, to thereby form the trim product 1 in which the skin layer 30 and the foamed layer 20 are attached or bonded to the profiled substrate layer 10. The foamed layer 20 was sufficiently expanded and had a thickness of about 1.0 mm. Also, embossed patterns (not shown) were formed on the skin layer 30 during the press molding step.

According to the present methods, the foamed layer 20 may be formed after completion of the press molding step. Therefore, the foamed layer 20 may have excellent elasticity and desirable physical properties, because the foamed layer 20 is not influenced by the pressure applied to the laminate 25 during the press molding step. In addition, the foamed layer 20 can be reliably adhered to the substrate layer 10 and the skin layer 30 by fusion bonding during the press molding step.

Further, according to the present methods, because the foamable material 22 is substantially incompressible, the foamable material 22 does not significantly compress during the press molding step. Therefore, a relatively high pressure can be applied to the substrate material 12 during the press molding step in order to desirably or sufficiently shape or profile the substrate material 12 during the press molding step. That is, relatively high pressure can be applied to the substrate material 12 during the press molding step, which is not possible using known techniques, because a foamed layer would be crushed by the high pressure applied during the press molding step. Such sufficient shaping or profiling of the substrate material 12 prevents the trim product 1 from having a dull profile.

In addition, embossed patterns optionally may be imparted to the skin material 32 during the press molding step. In this case, the embossed patterns formed on the skin material 32 cannot be deformed or destroyed during the press molding step and the skin layer 30 may have attractive embossed patterns. Thus, according to the present methods, the trim product 1 may have an attractive appearance and can be efficiently manufactured without increasing the number of basic manufacturing steps.

Although the substrate material 12 may be formed by compressing the material block 12' of the thermoplastic material, which comprises fibrous materials and molten thermoplastic resins, the substrate material 12 also can be directly formed from the thermoplastic material. In addition, although the laminate 25 may be formed by simultaneously forming and bonding the skin material 32 with the foamable material 22, the laminate 25 can be prepared from a skin material 32 and a foamable material 22 that are separately formed and then bonded. Further, although the skin material 32 and the foamable material 22 may be disposed within the press molding apparatus 45 as the laminate 25, these materials 32, 22 may instead be separately disposed within the press molding apparatus 45. In such case, only the skin material 32 will be drawn towards the upper molding die surface 7a. Furthermore, these materials 32, 22 may be separately heated to different temperatures prior to introduction into the press molding apparatus 45. In the alternative, at least one of the materials 32, 22 may be heated to a desired temperature prior to introduction into the press molding apparatus 45.

Although the laminate 25 and substrate material 12 may be respectively disposed on the upper and lower molding dies 7 and 5, the laminate 25 and the substrate material 12 can be disposed between the dies 7, 5. Further, additional materials, such as adhesives, may be applied between the skin material 32 and the foamable material 22 and/or between the foamable material 22 and the substrate material 12, if necessary.

Further, although a profiled door trim product 1 was exemplified as a press molded article according to the present teachings, press molded articles according to the present teachings are not limited to such a board-like or panel-like member and may be strip-like or rod-like members. Moreover, the press molded article is not limited to parts of a vehicle body, as the present teachings are equally applicable to a variety of other parts, such as interior furnishing components for buildings, furniture and sundry articles.

A representative example of the present invention has been described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present teachings.

What is claimed is:

1. A method for manufacturing a press molded article that comprises a substrate layer and a foamed layer, comprising:

press molding, a substrate material and a foamable material under pressure, thereby forming the substrate layer and joining the foamable material to the substrate layer, expanding the foamable material after completing the press molding step, thereby forming the foamed layer, and prior to the press molding step, heating the substrate material to a temperature higher than a temperature that generates cell forming substances within the foamable material, wherein the press molding step further comprises healing the foamable material to a temperature that generates cell forming substances within the foamable material, and wherein the expanding step comprises reducing the pressure that is applied to the foamable material to a pressure that is less than the pressure applied to the foamable material during the press molding step.

2. A method as defined in claim 1, wherein the press molding step further comprises heating the foamable material using heat from the heated substrate material.

3. A method as defined in claim 1, further comprising disposing a skin material on the foamable material prior to the press molding step.

4. A method as defined in claim 3, wherein the press molding step further comprises embossing the skin material, thereby forming an embossed skin layer.

5. A method as defined in claim 3, wherein the press molding step further comprises heating the foamable material to a temperature that generates cell forming substances within the foamable material, and wherein the expanding step comprises reducing the pressure that is applied to the foamable material to a pressure that is less than the pressure applied to the foamable material during the press molding step.

6. A method as defined in claim 5, wherein the press molding step further comprises heating the foamable material using heat from the heated substrate material.

7. A method as defined in claim 6, wherein the press molding step further comprises embossing the skin material, thereby forming an embossed skin layer.

8. A method as in claim 1, wherein an intermediate press molded article is formed by the press molding step, in which an intermediate foamed layer is attached to the substrate layer, and wherein the expanding step further comprises expanding the intermediate foamed layer, to thereby form the press molded article in which the foamed Layer is attached to the substrate layer.

9. A method as defined in claim 8, wherein the foamable material comprises a foaming agent, and wherein the press molding step further comprises decomposing the foaming agent in order to generate cell forming substances within the intermediate foamed layer, but the pressure applied during the press molding step substantially prevents the cell forming substances from expanding to form cells within the intermediate foamed layer.

10. A method as defined in claim 9, wherein the expanding step further comprises reducing the pressure that is applied to the intermediate foamed layer during the press molding step, thereby enabling the cell forming substances to expand and generate cells within the intermediate foamed layer.

11. A method as in claim 10, wherein the press molding step further comprises imparting a profile to the substrate material, thereby forming a profiled substrate layer.

12. A method as in claim 1, wherein the press molding step further comprises imparting a profile to the substrate material, thereby forming a profiled substrate layer.

* * * * *